(12) United States Patent
Vankamamidi et al.

(10) Patent No.: US 11,663,185 B2
(45) Date of Patent: May 30, 2023

(54) TECHNIQUES FOR CROSS-VALIDATING METADATA PAGES

(71) Applicant: EMC IP Holding Company LLC, Hopkinton, MA (US)

(72) Inventors: Vamsi K. Vankamamidi, Hopkinton, MA (US); Philippe Armangau, Acton, MA (US); Geng Han, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 137 days.

(21) Appl. No.: 16/944,549

(22) Filed: Jul. 31, 2020

(65) Prior Publication Data

US 2022/0035785 A1 Feb. 3, 2022

(51) Int. Cl.
  *G06F 16/22* (2019.01)
  *G06F 16/2457* (2019.01)
  *G06F 16/215* (2019.01)
  *G06F 12/0873* (2016.01)
  *G06F 16/11* (2019.01)
  *G06F 12/0882* (2016.01)
  *G06F 16/28* (2019.01)

(52) U.S. Cl.
  CPC ...... *G06F 16/2246* (2019.01); *G06F 12/0873* (2013.01); *G06F 12/0882* (2013.01); *G06F 16/128* (2019.01); *G06F 16/215* (2019.01); *G06F 16/24573* (2019.01); *G06F 16/288* (2019.01)

(58) Field of Classification Search
  CPC .......... G06F 16/2246; G06F 16/24573; G06F 16/215; G06F 16/288; G06F 16/128; G06F 12/0873; G06F 12/0882
  See application file for complete search history.

(56) References Cited

U.S. PATENT DOCUMENTS

| | | |
|---|---|---|
| 9,152,353 B1 | 10/2015 | Wang et al. |
| 9,916,191 B1 | 3/2018 | Pan et al. |
| 9,990,156 B1 * | 6/2018 | Kandamuthan ......... G06F 3/065 |
| 11,163,678 B2 | 11/2021 | Vankamamidi et al. |
| 2012/0023092 A1 * | 1/2012 | Egan ................. G06F 16/24542 707/718 |
| 2015/0324122 A1 * | 11/2015 | Kaminaga .............. G11C 16/08 711/103 |

(Continued)

*Primary Examiner* — Sherief Badawi
*Assistant Examiner* — William P Bartlett
(74) *Attorney, Agent, or Firm* — BainwoodHuang (57) ABSTRACT

A method of validating metadata pages that map to user data in a data storage system is provided. The method includes (a) obtaining first information stored for a first metadata page and second information stored for a second metadata page, the first and second metadata pages having a relationship to each other within a hierarchy of metadata pages for accessing user data; (b) performing a consistency check between the first information and the second information, the consistency check producing a first result in response to the relationship being verified and a second result otherwise; and (c) in response to the consistency check yielding the second result, performing a corrective action to restore consistency between the first and second information. An apparatus, system, and computer program product for performing a similar method are also provided.

16 Claims, 5 Drawing Sheets

(56) References Cited

U.S. PATENT DOCUMENTS

2017/0300248 A1\* 10/2017 Purohit .................. G06F 3/067
2018/0137014 A1\* 5/2018 Li ....................... G06F 11/1458
2019/0384706 A1\* 12/2019 Kao .................... G06F 12/0868
2021/0390015 A1 12/2021 Armangau et al.

\* cited by examiner

TECHNIQUES FOR CROSS-VALIDATING METADATA PAGES

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems use metadata to manage user data in a plurality of logical disks. The metadata may be used to translate a logical address into a physical address of the user data.

SUMMARY

Some modern storage systems arrange the metadata in a hierarchy such as one or more B-trees to manage and locate user data. Thus, the position of metadata within the hierarchy may correspond to a logical address at which user data is located. Unfortunately, errors in metadata pages may cause them to become misplaced within the hierarchy, resulting in data loss or data unavailability.

Therefore, it would be desirable to detect such errors so that they may be corrected before the metadata becomes irreparably corrupted. This may be accomplished by performing validation on metadata pages to verify that related metadata pages within the hierarchy are consistent. If descriptive information for two pages that ought to be related is not consistent, then it is likely that one of the metadata pages has become misplaced or that the descriptive information has become corrupted. Validation of this kind may be performed as part of certain I/O processing, thus, rapidly detecting errors in order to initiate corrective actions.

In one embodiment, a method of validating metadata pages that map to user data in a data storage system is provided. The method includes (a) obtaining first information stored for a first metadata page and second information stored for a second metadata page, the first and second metadata pages having a relationship to each other within a hierarchy of metadata pages for accessing user data; (b) performing a consistency check between the first information and the second information, the consistency check producing a first result in response to the relationship being verified and a second result otherwise; and (c) in response to the consistency check yielding the second result, performing a corrective action to restore consistency between the first and second information. An apparatus, system, and computer program product for performing a similar method are also provided.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments are directed to techniques for detecting consistency errors within metadata arranged in a hierarchy used to manage and locate user data so that the errors may be corrected before the metadata becomes irreparably corrupted. This may be accomplished by performing (potentially frequent) validation on metadata pages to verify that related metadata pages within the hierarchy are consistent. If descriptive information for two pages that ought to be related is not consistent, then it is likely that one of the metadata pages has become misplaced or that the descriptive information has become corrupted. Validation of this kind may be performed as part of certain I/O processing, thus, rapidly detecting errors in order to initiate corrective actions.

Figure 1:
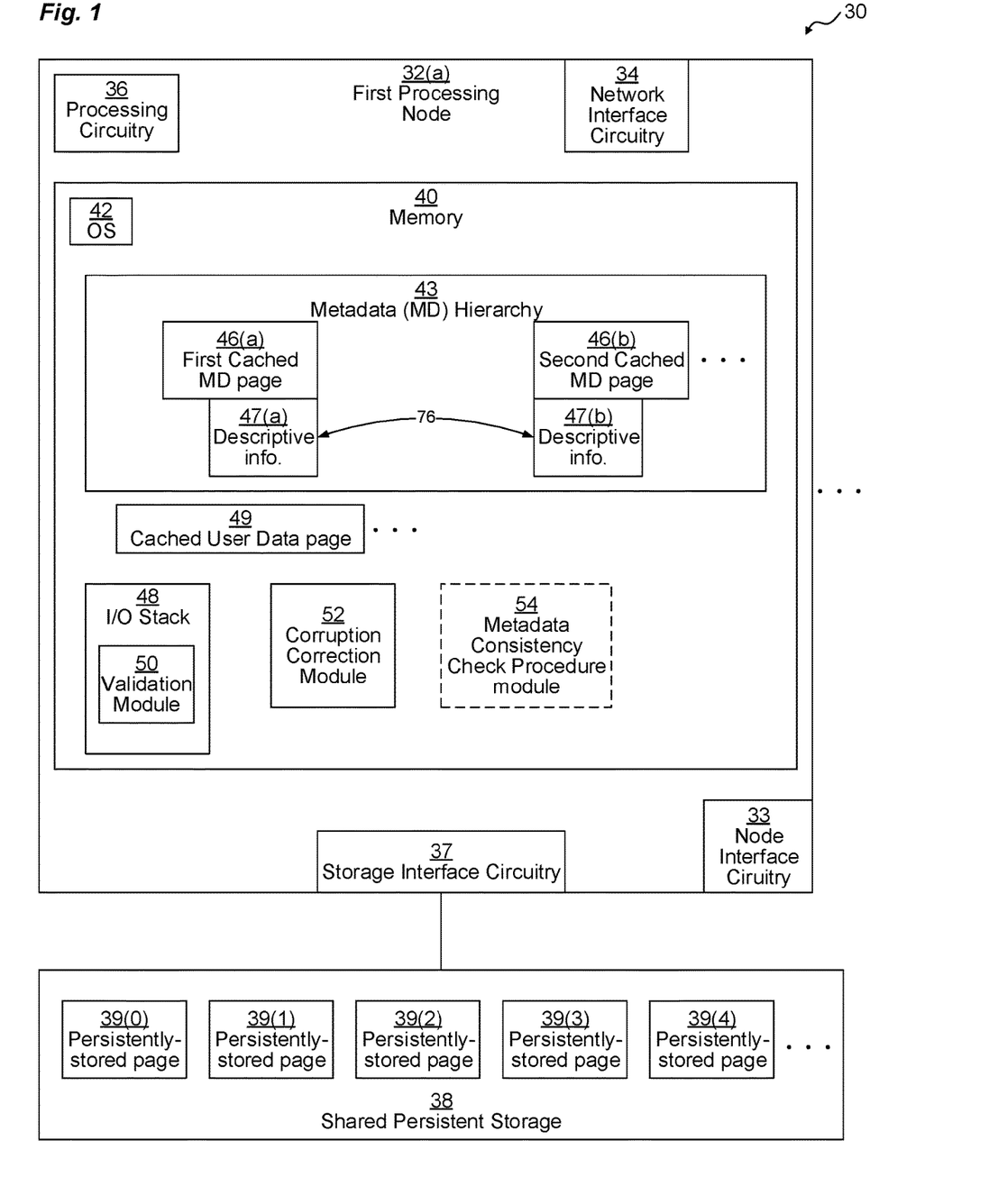
FIG. 1 is a block diagram depicting an example system, apparatus, and data structure arrangement for use in connection with various embodiments.

FIG. 1 depicts an example data storage system (DSS) 30. DSS 30 may be configured as one or more data storage apparatuses/arrays in one or more housings.

DSS 30 includes one or more processing nodes (hereinafter "nodes") 32 (depicted as first processing node 32(a) . . . ). DSS 30 also includes shared persistent storage 38 communicatively coupled to the nodes 32.

Each node 32 may be any kind of computing device, such as, for example, a personal computer, workstation, server computer, enterprise server, data storage array device, laptop computer, tablet computer, smart phone, mobile computer, etc. In one example embodiment, each node 32 is a blade server, while in another example embodiment, each node 32 is a rack-mount server. In some embodiments, the nodes 32 and the shared persistent storage 38 are both mounted on the same server rack.

Each node 32 at least includes processing circuitry 36, storage interface circuitry 37, and memory 40. In some embodiments, a node 32 may also include node interface circuitry 33 and network interface circuitry 34 as well as various other kinds of interfaces (not depicted). In some embodiments, a node 32 may also include a non-volatile transaction cache (not depicted). Nodes 32 also include interconnection circuitry between their various components (not depicted).

Processing circuitry 36 may include any kind of processor or set of processors configured to perform operations, such as, for example, a microprocessor, a multi-core microprocessor, a digital signal processor, a system on a chip, a collection of electronic circuits, a similar kind of controller, or any combination of the above.

Storage interface circuitry 37 controls and provides access to shared persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage devices (not depicted), such as, for example, hard disk drives, solid-state storage devices (SSDs), flash drives, etc.

Network interface circuitry 34 may include one or more Ethernet cards, cellular modems, Fibre Channel (FC) adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc. Network interface circuitry 34 allows a node 32 to communicate with one or more host devices (not depicted) over the network.

Memory 40 may be any kind of digital system memory, such as, for example, random access memory (RAM). Memory 40 stores an operating system (OS) 42 in operation (e.g., a Linux, UNIX, Windows, MacOS, or similar operating system). Memory 40 also stores an I/O stack 48 configured to process storage requests with respect to the shared persistent storage 38 and a corruption correction module 52. Memory 40 may also include a metadata consistency check procedure (MCCP) module 54 and other software modules (not depicted) which each execute on processing circuitry 36.

I/O stack 48 is a layered arrangement of drivers and/or other software constructs (not depicted) configured to process I/O storage requests (not depicted), e.g., from remote hosts, directed at the DSS 30. The storage requests, at the top of the I/O stack 48, are high-level requests directed to particular logical disks and logical addresses therein. As the requests proceed down the stack, these are translated into lower-level access requests to particular physical addresses on disks/drives of the shared persistent storage 38. At a low level, shared persistent storage 38 stores a plurality of persistently-stored pages 39 (depicted as persistently-stored pages 39(0), 39(1), 39(2), 39(3), 39(4), . . . ). These pages 39 may include user data pages and/or metadata pages and may also be referred to as "blocks."

Some of the pages 39 that store metadata may be loaded into memory 40 as cached metadata (MD) pages 46 (depicted as first cached MD page 46(a), second cached MD page 46(b), . . . ), and other pages 39 that store user data may be loaded into memory 40 as cached user data pages 49. It should be understood that, in some embodiments, it is possible for a cached page 46, 49 to be stored in memory without having yet been stored to persistent storage 38 (e.g., if temporarily stored in a non-volatile cache). In some embodiments, cached pages 46, 29 may be stored within a separate cache portion (not depicted) of memory 40.

The metadata used to organize the user data stored on shared persistent storage 38 into a plurality of logical disks is contained within MD hierarchy 43. MD hierarchy 43 includes a plurality of MD pages arranged in a hierarchical manner. At least some of the MD pages of the MD hierarchy 43 are stored as cached MD pages 46 within memory 40. In some embodiments, other MD pages of the MD hierarchy 43 may be stored only on persistent storage 38, until needed. The entire MD hierarchy 43 may be stored on persistent storage 38, except to the extent that some of the cached MD pages 46 have not yet been flushed to to persistent storage 38. Further detail with respect to the MD hierarchy is described below in connection with FIG. 2.

At least some of the cached MD pages 56 include associated information 47 (depicted as information 47(a) associated with first cached MD page 46(a), information 47(b) associated with second cached MD page 46(b), . . . ). In some embodiments, the information 47 is stored within its associated cached MD page 46, while in other embodiments, the information 47 may be stored outside of its associated cached MD page 46. Information 47 may include various kinds of information, such as, for example, an identifier (ID) of a group to which its associated cached MD page 46 belongs, a positional address of a beginning of a logical address range of user data pages indexed by its associated cached MD page 46, etc.

I/O stack 48 includes a validation module 50, which operates to perform validation operations on the cached MD pages 46 as they are accessed by the I/O stack 48. Validation module 50 performs various types of validation operations to ensure that the cached MD pages 46 and their associated information 47 are consistent with other cached MD pages 46 of the MD hierarchy 43. If validation module 50 detects an inconsistency, then validation module 50 calls the corruption correction module 52 to attempt error correction of the cached MD pages 46 with inconsistencies. In some embodiments, if corruption correction module 52 is unsuccessful in correcting the error in a cached MD page 46, then it may call upon MCCP module 54 to perform a more burdensome, offline MCCP. Embodiments preferably avoid this outcome, however, if correction or adaptation can be performed without the need to take the DSS 30 offline.

MCCP module 54 may be activated when system metadata requires a consistency check (e.g., if validation module 50 detects an inconsistency and corruption correction module 52 is unable to resolve the inconsistency, if another error is found in a cached MD page 46 that also cannot be resolved by corruption correction module, etc.) In some embodiments, once an MCCP is initiated, all logical disks that are indexed by the same MD hierarchy 43 are taken off-line. In other embodiments, the logical disks may remain on-line in a read-only mode. Once activated, MCCP module 54 performs a cross-check of all metadata, correcting errors where found. One example implementation of an MCCP is described in U.S. patent application Ser. No. 16/819,722 (filed Mar. 16, 2020), incorporated herein by this reference.

In some embodiments, a node 32 may contain a non-volatile transaction cache (not depicted). A non-volatile transaction cache is a persistent cache that is faster than the shared persistent storage 38, such as, for example, flash memory, 3D XPoint memory produced by Intel Corp. and Micron Corp., and other similar technologies. As the non-volatile transaction cache is persistent, the contents of the non-volatile transaction cache are preserved upon a restart of the node 32. Thus, when a cached user data page 49 or cached metadata page 46 is updated within memory 40, it may be stored forthwith in the non-volatile transaction cache. This arrangement enables an incoming write request to be acknowledged immediately upon storage of its data in the non-volatile transaction cache, even though such data has not yet been persisted to the shared persistent storage 38. Thus, for example, a non-volatile transaction cache may store a "dirty" version of a cached page 46, 49, which differs from a corresponding persistently-stored version 39 of the same page. The page in the non-volatile transaction cache is considered "dirty" because it is more up-to-date than the corresponding persistently-stored page 39 because it has not yet been flushed to shared persistent storage 38.

Memory 40 may also store various other data structures used by the OS 42, I/O stack 48, validation module 50, corruption correction module 52, MCCP module 54, and various other applications and drivers. In some embodiments, memory 40 may also include a persistent storage portion (not depicted). Persistent storage portion of memory 40 may be made up of one or more persistent storage devices, such as, for example, magnetic disks, flash drives, solid-state storage drives, or other types of storage drives. Persistent storage portion of memory 40 or shared persistent storage 38 is configured to store programs and data even while the node 32 is powered off. The OS 42, I/O stack 48, validation module 50, corruption correction module 52, MCCP module 54, and various other applications and drivers are typically stored in this persistent storage portion of memory 40 or on shared persistent storage 38 so that they may be loaded into a system portion of memory 40 upon a system restart or as needed. The OS 42, I/O stack 48, validation module 50, corruption correction module 52, MCCP module 54, and various other applications and drivers, when stored in non-transitory form either in the volatile portion of memory 40 or on shared persistent storage 38 or in persistent portion of memory 40, each form a computer program product. The processing circuitry 36 running one or more applications thus forms a specialized circuit constructed and arranged to carry out the various processes described herein.

In example operation, storage operations are processed through the I/O stack 48, including accessing first cached MD page 46(a) and second cached MD page 46(b) in order to locate a persistently stored page 39. As the first and second cached MD pages 46(a), 46(b) are accessed, validation module 50 performs a cross-validation operation 76 with respect to the respective information 47(a), 47(b) of those pages 46(a), 46(b). That cross-validation operation includes performing a consistency check operation between the information 47(a), 47(b). If the information 47(a), 47(b) is consistent, operation proceeds as normal through the I/O stack 48. Otherwise, validation module 50 calls corruption correction module 52 to apply a corrective action to fix the inconsistency.

Figure 2:
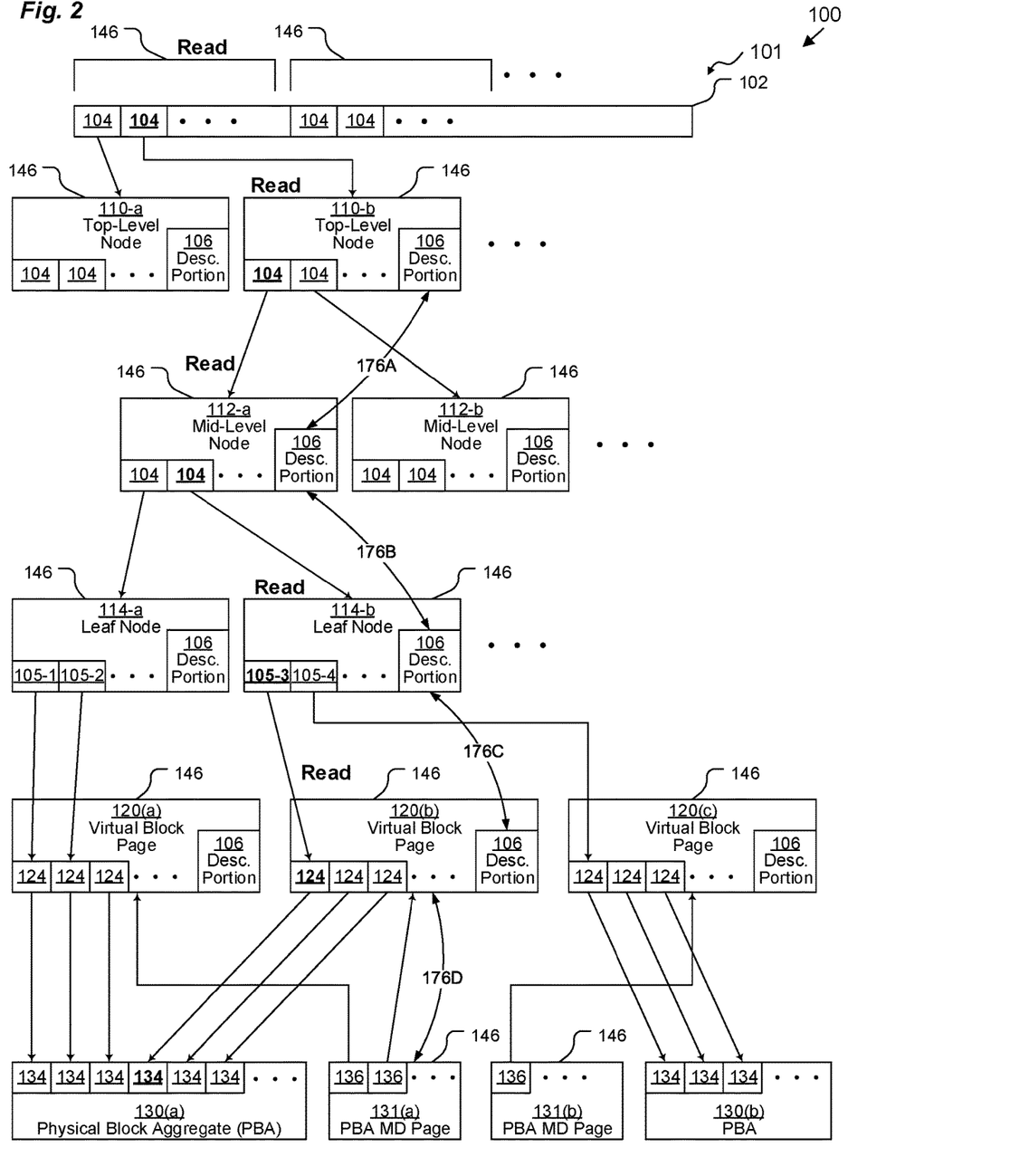
FIG. 2 is a block diagram depicting an example data structure arrangement for use in connection with various embodiments.

FIG. 2 depicts an example data structure arrangement 100 in the context of performing a READ operation on user data stored in the shared persistent storage 38. Arrangement 100 includes a metadata hierarchy 101 for locating pages 134 of user data.

Metadata hierarchy 101 is a collection of B-trees (or a B-tree-like structures), and it includes a root structure 102, a set of top-level nodes 110 (depicted as top-level nodes 110-a, 110-b, . . . ), a set of mid-level nodes 112 (depicted as mid-level nodes 112-a, 112-b, . . . ), a set of leaf nodes 114 (depicted as leaf nodes 114-a, 114-b, . . . ), and a set of virtual block pages (depicted as virtual block pages 120(a), 120(b), 120(c)). Position within the metadata hierarchy 101 indicates an address or address range.

The metadata hierarchy 101 may address a very large logical address space, such as, for example eight petabytes (PB). Each entry in the root structure 102 is a node pointer 104 that points to a top-level node 110. A top-level node 110 contains a plurality of node pointers 104 that each point to a mid-level node 112. A mid-level node 112 contains a plurality of node pointers 104 that each point to a leaf node 114. A leaf node 114 contains a plurality of virtual block pointers 105 that each point to a virtual block entry 124 within a virtual block page 120. As depicted each node 110, 112, 114 is implemented as a metadata page 146. In some embodiments, each metadata page 146 is four kilobytes (KB), holding up to 512 node pointers 104, virtual block pointers 105, or virtual block entries 124 plus a header and/or footer, which may contain a descriptive portion 106. The root structure 102 may also be made up of a plurality of metadata pages 146, each of which stores 512 node pointers 104.

Each virtual block page (VBP) 120 is made up of one or more metadata page 146 containing a plurality of virtual block entries 124 and a descriptive portion 106. In one embodiment, a VBP 120 is a single metadata page 146, while in another embodiment, a VBP 120 is made up of three adjoining metadata pages 146. Each virtual block entry 124 points to a user data block 134, and several user data blocks 134 may be aggregated together into a physical block aggregate (PBA) 130. Typically, all virtual block entries 124 within a single VBP 120 point to user data blocks 134 that are all within the same PBA 130. In one example embodiment, a VBP 120 contains 512 virtual block entries 124.

In one embodiment, a PBA 130 is two megabytes, and a user data block 134 is 4 KB. In some embodiments, each user data block 134 may be compressed, allowing up to 2048 compressed user data blocks 134 to be stored within a single PBA 130. Thus, in an example embodiment in which a VBP 120 contains 512 virtual block entries 124 and a PBA contains up to 2048 compressed user data blocks 134, up to eight VBPs 120 may point to a single PBA 130.

Each PBA 130 (depicted as PBAs 130(a), 130(b)) has an associated physical block aggregate metadata page (PBAMDP) 131 (depicted as PBAMDPs 131(a), 131(b)). A PBAMDP 131 is a metadata page 146, and it contains a set of back pointers 136 to the set of VBPs 120 that that point to its associated PBA 130. Thus, for example, as depicted, since virtual block entries 124 of VBPs 120(a), 120(b) point to PBA 130(a), its associated PBAMDP 131(a) contains back pointers 136 that point back to VBPs 120(a) and 120(b). As depicted, since virtual block entries 124 of VBP 120(c) point to PBA 130(b), its associated PBAMDP 131(b) contains a back pointer 136 that point back to VBP 120(b).

As depicted, the READ operation is directed at the fourth physical block 134 from the left within PBA 130(a), which has a logical address corresponding to the position of pointer 105-3 (part of leaf node 114-b) within the metadata hierarchy 101. In order to read that physical block 134, it must be located, which involves traversing the metadata hierarchy 101 and reading several metadata pages 146 along the way, including one metadata page 146 of each of the root structure 102, top-level node 110-b, mid-level node 112-a, leaf node 114-b, and VBP 120(b). Thus, fulfilling a READ operation on a single page 434 of user data involves reading at least five metadata pages 146.

Several cross-validation operations 176 are depicted in FIG. 2. These are all so-called "vertical" cross-validation operations 176 because they all involve checking consistency up and down the MD hierarchy 101.

Vertical cross-validation operation 176A determines whether or not there is consistency between information 47 within descriptive portions 106 of top-level node 110-b and mid-level node 112-a, which are both part of the READ path.

Vertical cross-validation operation 176B determines whether or not there is consistency between information 47 within descriptive portions 106 of mid-level node 112-a and leaf node 114-b, which are both part of the READ path.

Vertical cross-validation operation 176C determines whether or not there is consistency between information 47 within descriptive portions 106 of leaf node 114-b and VBP 120(b), which are both part of the READ path.

Vertical cross-validation operation 176D is a bit different. Vertical cross-validation operation 176D determines whether or not there is consistency between information 47 within PBAMDP 131(a) and information 47 within descriptive portion 106 of VBP 120(b). Although VP 120(b) is part of the READ path, PBAMDP 131(a) is read mainly to ensure consistency.

Figure 3A:
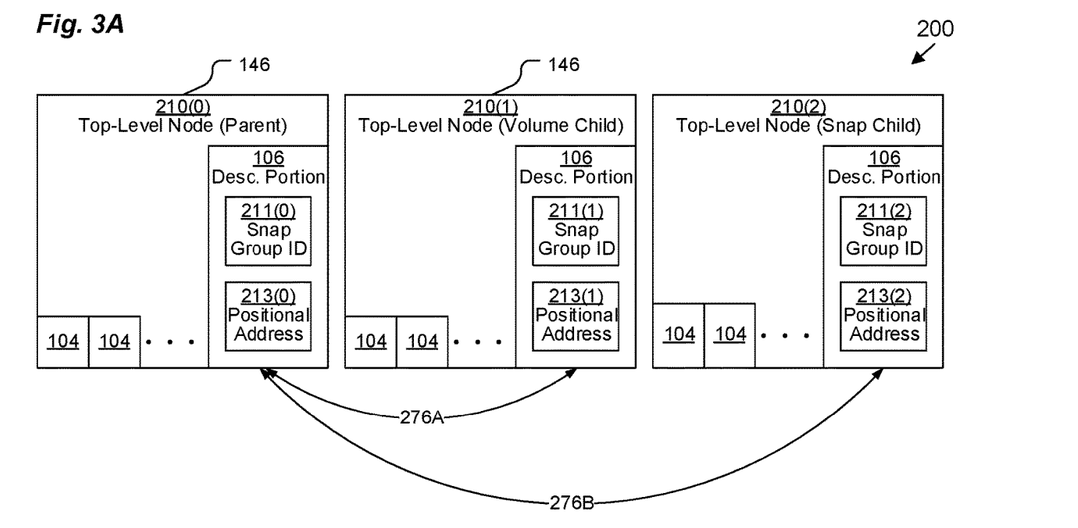
FIGS. 3A and 3B are block diagrams depicting example data structure arrangements for use in connection with various embodiments.

FIG. 3A depicts an example data structure arrangement 200 in the context of performing so-called "horizontal" cross-validation operations 276 on peer top-level nodes 210 generated as a result of a snapshot creation. Initially, a logical disk (original volume) of size up to 512 GB may be represented by a single top-level node 210(0) (together with its child mid-level and leaf nodes 112, 114). In some embodiments, when a snapshot is taken of the logical disk, that top-level node 210(0) is cloned to create two "child" peer nodes 210(1), 210(2). One of these is designated a "Volume Child" node 210(1), which newly represents the logical disk, while the other is designated a "Snap Child" node 210(2), which represents the snapshot of the logical disk. As long as no writes are performed, the node pointers 104 of all three peer top-level nodes 210(0), 210(1), 210(2) remain identical, so these three peer top-level nodes 210(0), 210(1), 210(2) all share the same mid-level and leaf nodes 112, 114 as children.

When the "Volume Child" node 210(1) and "Snap Child" node 210(2) are created, their respective descriptive portions 106 are populated with data. At least some of the descriptive information in the descriptive portions 106 of both child peer nodes 210(1), 210(2) is copied to be identical to the descriptive information in the descriptive portions 106 of parent peer node 210(0). For example, as depicted, the snap group ID 211(0) of the parent node 210(0) is copied to the snap group IDs 211(1), 211(2) of both child peer nodes 210(1), 210(2), since a logical disk and all of its snapshots should share the same snap group ID 211 to identify them as all being related and sharing some of the same metadata nodes 110, 112, 114, 120. As another example, the positional address 213(0) of the parent node 210(0) is copied to the positional address 213(1) of the volume child node 210(1), but the Snap child node 210(2) may be assigned a different positional address 213(2).

Horizontal cross-validation operation 276A compares information 47 (e.g., snap group ID 211 and positional address 213) from the descriptive portions 106 of the parent node 210(0) and the volume child node 210(1). For example, the snap group IDs 211(0), 211(1) are compared; if they differ, then it is clear that an error has been made, requiring correction. As another example, another group identifier (such as a deduplication group, not depicted) may be compared from the descriptive portions 106 of the parent node 210(0) and the volume child node 210(1); if they differ, then it is clear that an error has been made, requiring correction. As another example, the positional addresses 213(0), 213(1) are compared; if they differ, then it is clear that an error has been made, requiring correction.

Horizontal cross-validation operation 276B compares information 47 (e.g., snap group ID 211 and positional address 213) from the descriptive portions 106 of the parent node 210(0) and the snap child node 210(2). For example, the snap group IDs 211(0), 211(2) are compared; if they differ, then it is clear that an error has been made, requiring correction. As another example, another group identifier (such as a deduplication group, not depicted) may be compared from the descriptive portions 106 of the parent node 210(0) and the snap child node 210(2); if they differ, then it is clear that an error has been made, requiring correction. As another example, the positional addresses 213(0), 213(1) are compared; if they are the same, then it is clear that an error has been made, requiring correction.

It should be understood that horizontal cross-validation operations 276A, 276B are performed upon a snapshot creation being initiated, but typically horizontal cross-validation operations 276A, 276B are not performed between parent and child nodes.

Figure 3B:
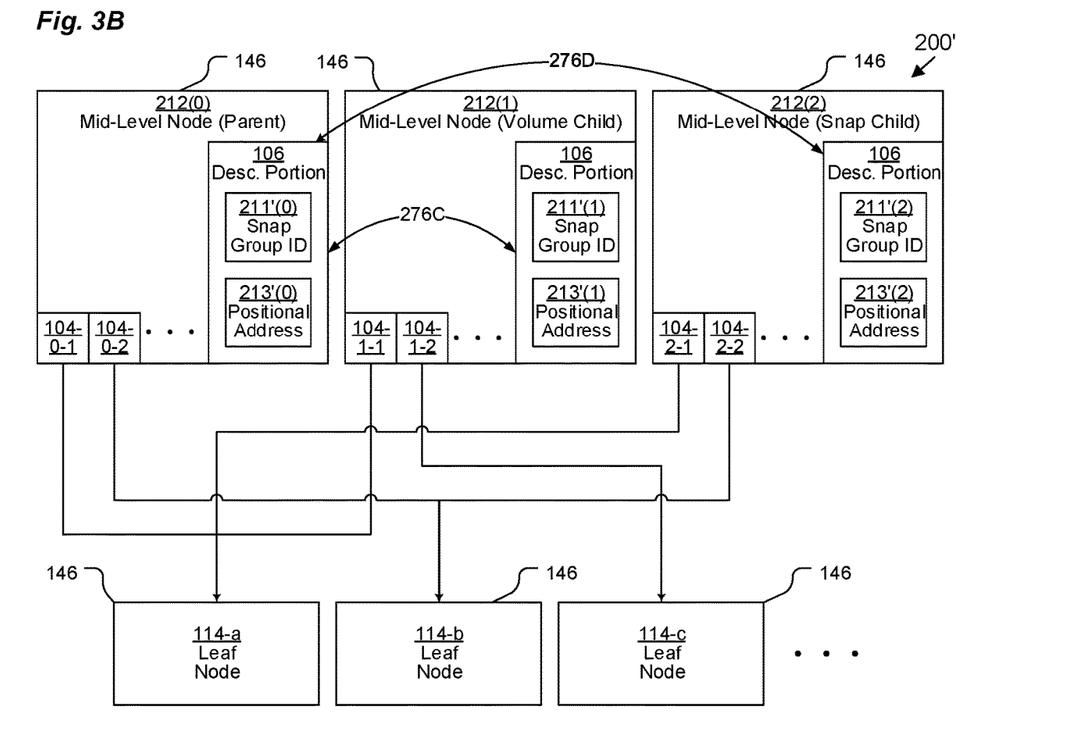

FIG. 3B depicts another example data structure arrangement 200' in the context of performing horizontal cross-validation operations 276 on peer mid-level nodes 212 generated as a result of a write split. A write split is a scenario in which a write is made to a production logical disk (e.g., an original volume represented by a top-level node 210(0)) which was sharing a mid-level or leaf node 212, 214 with a snapshot but now that sharing must be terminated because a user data block 134 indexed by that mid-level or leaf node 212, 214 is no longer the same for the production logical disk and the snapshot.

As depicted, parent mid-level node 212(0) initially contains node pointers 104-0-1, 104-0-2 that point to leaf nodes 114-a, 114-b, respectively. Upon the write split occurring, parent mid-level node 212(0) is cloned to create two "child" peer nodes 212(1), 212(2). One of these is designated a "Volume Child" node 212(1), which newly represents a portion of the production logical disk, while the other is designated a "Snap Child" node 212(2), which represents a portion of the snapshot of the logical disk. Due to the write split, node pointers 104-1-1, 104-1-2 of volume child node 212(1) point to leaf nodes 114-a, 114-c, respectively. Thus, as depicted, node pointer 104-1-2 differs from node pointer 104-0-2. However, also as depicted, node pointers 104-2-1, 104-2-2 of volume child node 212(1) point to leaf nodes 114-a, 114-b, respectively, just like node pointers 104-0-1, 104-0-2.

When the "Volume Child" node 212(1) and "Snap Child" node 212(2) are created, their respective descriptive portions 106 are populated with data. At least some of the descriptive information in the descriptive portions 106 of both child peer nodes 212(1), 212(2) is copied to be identical to the descriptive information in the descriptive portions 106 of parent peer node 212(0). For example, as depicted, the snap group ID 211'(0) of the parent node 212(0) is copied to the snap group IDs 211'(1), 211'(2) of both child peer nodes 212(1), 212(2), since a logical disk and all of its snapshots should share the same snap group ID 211' to identify them as all being related and sharing some of the same metadata nodes 114, 120. As another example, the positional address 213'(0) of the parent node 212'(0) is copied to the positional address 213'(1) of the volume child node 212(1), but the Snap child node 212(2) may be assigned a different positional address 213'(2).

Horizontal cross-validation operation 276C compares information 47 (e.g., snap group ID 211' and positional address 213') from the descriptive portions 106 of the parent node 212(0) and the volume child node 212(1). For example, the snap group IDs 211'(0), 211'(1) are compared; if they differ, then it is clear that an error has been made, requiring correction. As another example, another group identifier (such as a deduplication group, not depicted) may be compared from the descriptive portions 106 of the parent node 212(0) and the volume child node 212(1); if they differ, then it is clear that an error has been made, requiring correction. As another example, the positional addresses 213'(0), 213'(1) are compared; if they differ, then it is clear that an error has been made, requiring correction.

Horizontal cross-validation operation 276D compares information 47 (e.g., snap group ID 211' and positional address 213') from the descriptive portions 106 of the parent node 212(0) and the snap child node 212(2). For example, the snap group IDs 211'(0), 211'(2) are compared; if they differ, then it is clear that an error has been made, requiring correction. As another example, another group identifier (such as a deduplication group, not depicted) may be compared from the descriptive portions 106 of the parent node 212(0) and the snap child node 212(2); if they differ, then it is clear that an error has been made, requiring correction. As another example, the positional addresses 213'(0), 213'(1) are compared; if they are the same, then it is clear that an error has been made, requiring correction.

It should be understood that horizontal cross-validation operations 276C, 276D are performed upon a write split initially occurring, but typically horizontal cross-validation operations 276C, 276D are not performed between parent and child nodes.

It should also be understood that although FIG. 3B depicts arrangement 200' in the context of performing horizontal cross-validation operations 276C, 276D on peer mid-level nodes 212 generated as a result of a write split, similar cross-validation operations 276 may also be performed on peer leaf nodes 214 generated as a result of a write split.

Figure 4:
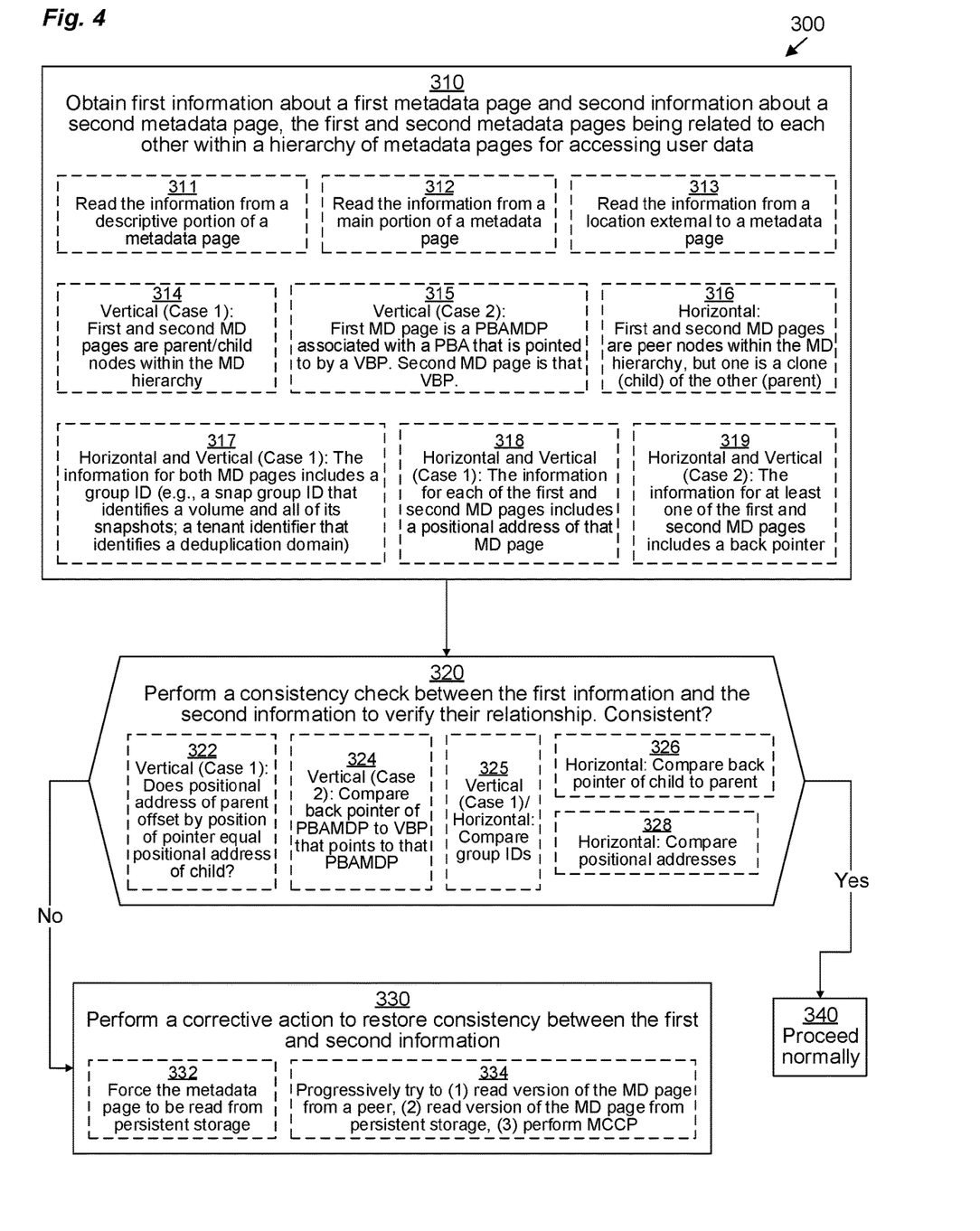
FIG. 4 is a flowchart depicting an example procedure according to various embodiments.

FIG. 4 illustrates an example method 300 performed by a node 32 for validating a metadata pages 46, 146 from a hierarchy 43, 101 of metadata pages 46, 146 that serve to locate user data in a DSS 30. It should be understood that any time a piece of software (e.g., OS 42, I/O stack 48, validation module 50, corruption correction module 52, MCCP module 54, etc.) is described as performing a method, process, step, or function, what is meant is that a computing device (e.g., a node 32) on which that piece of software is running performs the method, process, step, or function when executing that piece of software on its processing circuitry 36. It should be understood that one or more of the steps or sub-steps of method 300 may be omitted in some embodiments. Similarly, in some embodiments, one or more steps or sub-steps may be combined together or performed in a different order. Dashed lines indicate that a sub-step is either optional or representative of alternate embodiments or use cases.

In step 310, validation module 50 obtains first information 47(a) about a first metadata page 46(a) and second information 47(b) about a second metadata page 46(b), the first and second metadata pages 46(a), 46(b) being related to each other within the hierarchy 43, 101 of metadata pages 46, 146 for accessing user data.

In some embodiments, at least some of the information 47(a), 47(b) is read from a descriptive portion 106 (e.g., a header or footer) within the respective metadata pages 46(a), 46(b) (sub-step 311). In some embodiments, at least some of the information 47(a), 47(b) is read from a location external to the respective metadata pages 46(a), 46(b) (sub-step 313).

In some embodiments, some of the information 47(a), 47(b) may be read directly from a main portion of the respective metadata pages 46(a), 46(b) (sub-step 312). For example, in the event of a vertical validation (see cross-validation operation 176D from FIG. 2) involving a VBP 120 and a PBAMDP 131, the information 47 of the PBAMDP 131 may include the back pointers 136 (which are part of the main portion of the PBAMDP 131), and the information 47 of the VBP 120 may include the virtual block entries 124 (which are part of the main portion of the VBP 120).

The particular information 47 that is read as part of step 310 may vary depending on the embodiment and the use case.

Sub-steps 314-316 define three different use cases:

Sub-step 314 defines Case 1 of vertical validation (see cross-validation operations 176A, 176B, 176C) as a situation in which the first and second metadata pages 46(a), 46(b) have a parent/child relationship within MD hierarchy 43. For example, if one of metadata pages 46(a), 46(b) is a top-level node 110 and the other is a mid-level node 112 to which that top-level node 110 points; if one of metadata pages 46(a), 46(b) is a mid-level node 112 and the other is a leaf node 114 to which that mid-level node 112 points; or if one of metadata pages 46(a), 46(b) is a leaf node 114 and the other is a VBP 120 to which that leaf node 114 points; then sub-step 314 would define Case 1 of vertical validation.

Sub-step 315 defines Case 2 of vertical validation (see cross-validation operation 176D) as a situation in which the first and second metadata pages 46(a), 46(b) are related to each other vertically in a particular way. If one of metadata pages 46(a), 46(b) is a VBP 120 and the other is a PBAMDP 131 associated with a PBA 130 to which that VBP 120 points; then sub-step 315 would define Case 2 of vertical validation.

Sub-step 316 defines horizontal validation (see cross-validation operations 276A, 276B, 276C, 276D) as a situation in which the first and second metadata pages 46(a), 46(b) are related to each other as peer nodes 46 (i.e., they are "peer" nodes 46 because they are both at the same level of the MD hierarchy 101, such as, for example, two top-level nodes 110, two mid-level nodes 112, or two leaf nodes 114) and one is a clone (or child) of the other (parent). Thus, in the context of arrangement 200 of FIG. 3A, validation between nodes 210(0), 210(1) or between nodes 210(0), 210(2) would be considered horizontal validation under sub-step 316. Similarly, in the context of arrangement 200' of FIG. 3B, validation between nodes 212(0), 212(1) or between nodes 212(0), 212(2) would be considered horizontal validation under sub-step 316.

In some embodiments, sub-step 317 may be performed in the context of horizontal validation or Case 1 of vertical validation. In sub-step 317, the information 47(a), 47(b) that is obtained for the first and second metadata pages 46(a), 46(b) includes a group identifier, such as, for example, a snap group ID 211 or a tenant identifier (not depicted) that defines a deduplication domain (not depicted) throughout which user data is permitted to be deduplicated.

In some embodiments, sub-step 318 may be performed in the context of horizontal validation or Case 1 of vertical validation. In sub-step 318, the information 47(a), 47(b) that is obtained for the first and second metadata pages 46(a), 46(b) includes positional addresses 213 of those metadata pages 46(a), 46(b). It should be noted that even within Case 1 of vertical validation, sub-step 318 is typically omitted in the context of validation operation 176C.

In some embodiments, sub-step 319 may be performed in the context of horizontal validation or Case 2 of vertical validation. In sub-step 319, the information 47(a), 47(b) that is obtained for the first and second metadata pages 46(a), 46(b) includes a back pointer. Thus, for example, in Case 2 of vertical validation (e.g., validation operation 176D), sub-step 319 includes obtaining the back pointers 136. As another example, in the context of horizontal validation, sub-step 319 includes obtaining a back pointer (not depicted) from a volume child node 210(1), 212(1) or a snap child node 210(2), 212(2) (see FIGS. 3A, 3B) that should point back to the parent node 210(0), 212(0) that spawned it.

Then, in step 320, validation module 50 performs a consistency check operation between the first information 47(a) and the second information 47(b). If the first information 47(a) and the second information 47(b) is consistent, the relationship being verified, then operation proceeds normally in step 340. Otherwise operation proceeds with step 330.

The consistency check performed in step 320 includes at least one of sub-steps 322-328.

In sub-step 322, which may be performed in the context of Case 1 of vertical validation (e.g., typically in the case of operations 176A or 176B), validation module 50 checks whether the positional address 213 of the child node equals the positional address of the parent node offset by a position of the node pointer 104 in the parent node that pointed to the child node. Thus, for example, with reference to FIG. 2, validation operation 176A would include confirming whether the positional address 213 of top-level node 110-b is consistent with the positional address of its child node, mid-level node 112-a, offset by the position of the node pointer 104 of top-level node 110-b that pointed to mid-level node 112-a. Since, as depicted, mid-level node 112-a is pointed to by the first node pointer 104 of top-level node 110-b, the offset is zero, and therefore top-level node 110-b and mid-level node 112-a ought to have the same positional address 213. Since, as described above in connection with one example embodiment, a top-level node 110 addresses up to 512 GB, and since top-level node 110-b is the second top-level node 110 pointed to by root structure 102, positional address 213 of both top-level node 110-b and mid-level node 112-a ought to have a positional address 213 of 512 GB.

As another example, with further reference to FIG. 2, validation operation 176B would include confirming whether the positional address 213 of mid-level node 112-a is consistent with the positional address of its child node, leaf node 114-b, offset by the position of the node pointer 104 of mid-level node 112-a that pointed to leaf node 114-b. Since, as depicted, leaf node 114-b is pointed to by the second node pointer 104 of mid-level node 112-a, the offset is one times the addressable size of a leaf node 114. Since, as described above in connection with one example embodiment, a top-level node 110 addresses up to 512 GB and there are 512 node pointers 104 per top-level node 110 and 512 node pointers 104 per mid-level node 112, a mid-level node 112 addresses up to 1 GB and a leaf node 114 addresses up to 2 MB. Since leaf node 114-b is the second leaf node 114 pointed to by mid-level node 112-a, positional address 213 of leaf node 114-b ought to be offset from the positional address of mid-level node 112-a by 2 MB. Thus, the positional address 213 of leaf node 114-b ought to be 549,757,911,040 bytes.

In sub-step 324, which may be performed in the context of Case 2 of vertical validation (e.g., typically in the case of 176D), validation module 50 checks whether the back pointers 136 of a PBAMDP 131 point to the same VBPs 120 that include virtual block entries 124 that point to the PBA associated with that PBAMDP 131.

In some embodiments, all virtual block entries 124 within a single VBP 120 point to the same PBA 130. In such embodiments, user data blocks 134 are written once to a PBA 130. If that user data block 134 is modified, a new version is stored in a different PBA 130 pointed to by a different VBP 120. If that user data block 134 is deleted (and no instances of it remain as part of any logical disk or snapshot), then it and its virtual block entry 124 is invalidated. Once enough user data blocks 134 become invalidated within a PBA 130 (what qualifies as "enough" varies by embodiment, but, in one example, "enough" would be over 50%), that PBA is scheduled for garbage collection, in which its remaining valid user data blocks 134 are combined with valid user data blocks 134 from other PBAs 130 to create a new PBA 130. At that point, the original PBA 120 and its associated VBPs 120 are freed, and new VBPs 120 are allocated to point to the new PBA 130. This garbage collection may also be referred to as a "Combine & Append" (C&A) flush operation. Depending on the amount of compression, up to eight VBPs 120 may point to a single PBA 130. Thus, in these embodiments, a single PBAMDP 131 includes up to eight back pointers 136.

In sub-step 325, which may be performed in the context of horizontal validation or Case 1 of vertical validation, validation module 50 checks whether particular group identifiers of the first and second metadata pages 46(a), 46(b) are the same. Thus, for example, in one embodiment, validation module 50 checks whether the snap group IDs 211 of the first and second metadata pages 46(a), 46(b) are the same. In another embodiment, validation module 50 checks whether the tenant identifiers of the first and second metadata pages 46(a), 46(b) are the same. In another embodiment, both the snap group IDs 211 and the tenant identifiers are compared.

In sub-step 326, which may be performed in the context of horizontal validation, validation module 50 checks whether the back pointers from a volume child node 210(1), 212(1) or a snap child node 210(2), 212(2) (see FIGS. 3A, 3B) point back to the parent node 210(0), 212(0) that spawned it.

In sub-step 328, which may be performed in the context of horizontal validation, validation module 50 compares the positional addresses 213 or 213' of the first and second metadata pages 46(a), 46(b). In the case of horizontal validation between a volume child node 210(1), 212(1) and a parent node 210(0), 212(0) (e.g., horizontal validation operations 276A, 276C), if the positional addresses 211, 211' differ between parent and volume child, then step 320 yields a negative result; otherwise step 320 yields an affirmative result. Conversely, in the case of horizontal validation between a snap child node 210(2), 212(2) and a parent node 210(0), 212(0) (e.g., horizontal validation operations 276B, 276D), if the positional addresses 211, 211' differ between parent and volume child, then step 320 yields an affirmative result; otherwise step 320 yields a negative result.

In step 330, in response to a negative result from step 320, corruption correction module 52 performs a corrective action to restore consistency between the first and second information 47(a), 47(b).

For example, in some embodiments, in sub-step 332, corruption correction module 52 directs the I/O stack 48 to read a page 39 from persistent storage 38 that backs the first and second pages 46(a), 46(b) to replace the versions stored in memory 40, in case one of those cached pages 46(a), 46(b) was corrupted.

As another example, in some embodiments, in sub-step 334, corruption correction module 52 may initially attempt to replace the cached pages 46(a), 46(b) within memory 40 of the current node 32(a) with a corresponding cached version from a different peer node 32. If that fails to correct the error, then corruption correction module 52 proceeds to direct the I/O stack 48 to read a page 39 from persistent storage 38 that backs the first and second pages 46(a), 46(b) to replace the versions stored in memory 40. If that also fails, then corruption correction module 52 either initiates or directs an administrator to initiate a metadata consistency check operation. Sub-step 334 is similar to the approach for correcting errors in cached pages described in U.S. patent application Ser. No. 16/901,520 (filed Jun. 15, 2020), incorporated herein by this reference.

Figure 5:
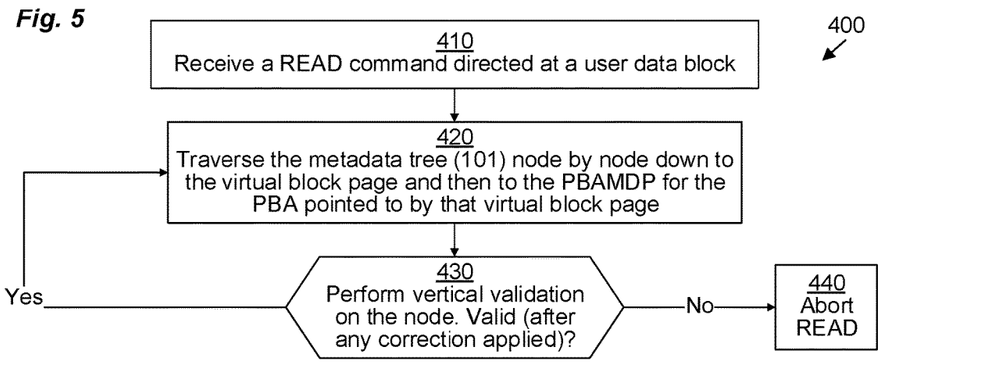
FIG. 5 is a flowchart depicting an example procedure according to various embodiments.

FIG. 5 depicts an example method 400 for performing validation as part of a READ operation. It should be understood that one or more of the steps or sub-steps of method 400 may be omitted in some embodiments. Similarly, in some embodiments, one or more steps or sub-steps may be combined together or performed in a different order.

In step 410, I/O stack 48 receives a READ command directed to reading a particular page 134 of user data indexed by the MD hierarchy 43, 101. The READ command should include the positional address of the desired page 134 as indexed within the metadata hierarchy 43, 101 (i.e., a logical block address within the 8 PB address space indexed by the MD hierarchy 101). In response, in step 420, I/O stack 48 traverses the MD hierarchy 101 working down from the root structure 102 through the various nodes 110, 112, 114, 120 along a path to the desired page 134. Once the PBA 130 holding the desired page 134 is accessed, the PBAMCP 131 associated with that PBA 130 is also accessed as part of the traversal.

As each MD node 110, 112, 114, 120, 131 is traversed, vertical validation is performed to validate that node in step 430. Thus, for example, for node pairs 110, 112; 112, 114; and 114, 120, method 300 may be performed, with sub-steps for Case 1 of vertical validation being utilized (e.g., sub-steps 314, 317, 318, 322, and 325; in a typical embodiment, sub-steps 318, 322 are omitted for node pair 114, 120), while for node pair 120, 131, method 300 may be performed, with sub-steps for Case 2 of vertical validation being utilized (e.g., sub-steps 315, 319, 324).

If step 320 of method 300 yields a negative result, then if the corrective action 330 is not able to resolve the error, the READ command is aborted (step 440). Otherwise, if the corrective action 330 does resolve the error, then operation returns back to step 420 for further traversal down the MD hierarchy 101. Similarly, if step 320 of method 300 yields an affirmative result, then after step 340, operation also returns back to step 420 for further traversal down the MD hierarchy 101. Once the PBA 130 holding the desired page 134 is validated, then method 400 terminates, and operation proceeds normally for fulfilling the READ command (e.g., the data of the desired page 134 is read and returned up the I/O stack 48).

Figure 6:
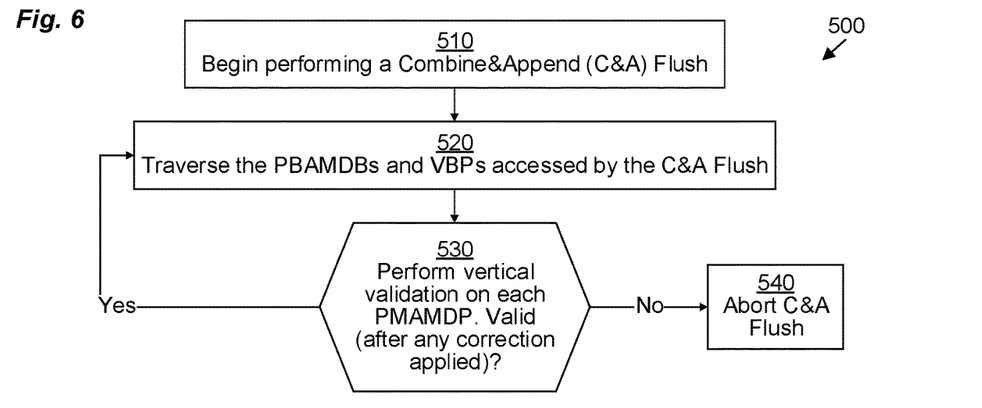
FIG. 6 is a flowchart depicting an example procedure according to various embodiments.

FIG. 6 depicts an example method 500 for performing validation as part of a C&A flush operation. It should be understood that one or more of the steps or sub-steps of method 500 may be omitted in some embodiments. Similarly, in some embodiments, one or more steps or sub-steps may be combined together or performed in a different order.

In step 510, I/O stack 48 begins performing a C&A flush operation to combine two or more PBAs 130 into a new PBA 130. Then, in step 520, I/O stack 48 traverses the various PBAMDPs 131 and VBPs 120 associated with the PBAs 130 that are being combined as part of the C&A flush operation. As this traversal progresses, in step 530, vertical validation (Case 2) is performed to validate that the back pointers 136 of the PBAMDPs 131 associated with the PBAs 130 being combined only point to VBPs 120 all of whose virtual block entries 124 only point to the correct PBA 130. Thus, for example, method 300 may be performed, with sub-steps for Case 2 of vertical validation being utilized (e.g., sub-steps 315, 319, and 324).

If step 320 of method 300 yields a negative result, then if the corrective action 330 is not able to resolve the error, the C&A flush operation is aborted (step 540). Otherwise, if the corrective action 330 does resolve the error, then operation returns back to step 520 for further traversal. Similarly, if step 320 of method 300 yields an affirmative result, then after step 340, operation also returns back to step 520 for further traversal. Once the traversal of step 520 has completed, then method 500 terminates, and operation proceeds normally for completing the C&A flush operation (e.g., the PBAs 130 are read, combined into one or more new PBAs 130 and flushed to persistent storage 38, and the original PBAs 130 are freed).

Figure 7:
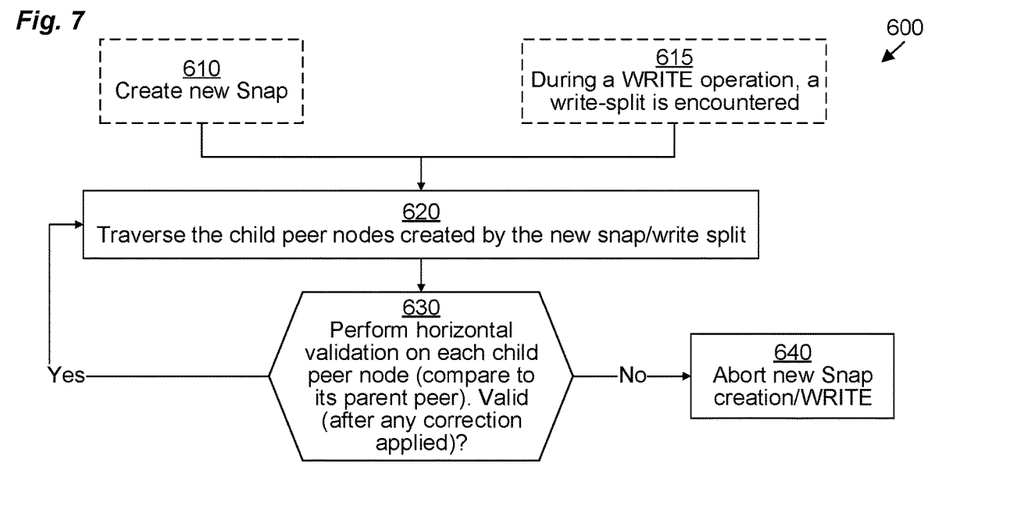
FIG. 7 is a flowchart depicting an example procedure according to various embodiments.

FIG. 7 depicts an example method 600 for performing horizontal validation. It should be understood that one or more of the steps or sub-steps of method 600 may be omitted in some embodiments. Similarly, in some embodiments, one or more steps or sub-steps may be combined together or performed in a different order. Dashed lines indicate that steps are representative of alternate embodiments or use cases.

Method 600 may be initiated either by step 610 or step 615.

In step 610, I/O stack 48 receives a command directing that a new snapshot be created. This may involve cloning (with modification as needed) a parent top-level node 210(0), as depicted in FIG. 3A, to create a new volume child top-level node 210(1) and a new snap child top-level node 210(2).

In step 615, while I/O stack 48 is performing a WRITE operation, a write-split is encountered at level of the mid-level nodes 212 or leaf nodes 214. Thus, as depicted in FIG. 3B, a mid-level node 212(0) is cloned (with modification as needed) to create a new volume child mid-level node 212(1) and a new snap child mid-level node 212(2).

Then, in step 620, I/O stack 48 traverses through the various child peer nodes that were created by the snapshot creation from step 610 (e.g., child top-level nodes 210(1), 210(2)) or by the write-split from step 615 (e.g., child mid-level nodes 212(1), 212(2)). As this traversal progresses, in step 630, horizontal validation is performed to validate consistency between the child top-level node being traversed and its respective parent node. Thus, for example, volume child top-level node 210(1) is horizontally-validated against parent top-level node 210(0); snap child top-level node 210(2) is horizontally-validated against parent top-level node 210(0); volume child mid-level node 212(1) is horizontally-validated against parent top-level node 210(0); snap child mid-level node 212(2) is horizontally-validated against parent top-level node 210(0); etc. Thus, for example, method 300 may be performed, with sub-steps for horizontal validation being utilized (e.g., sub-steps 316-319 and 325-328).

If step 320 of method 300 yields a negative result, then if the corrective action 330 is not able to resolve the error, the new snap creation (see step 610) or WRITE (see step 615) operation is aborted (step 640). Otherwise, if the corrective action 330 does resolve the error, then operation returns back to step 620 for further traversal. Similarly, if step 320 of method 300 yields an affirmative result, then after step 340, operation also returns back to step 620 for further traversal. Once the traversal of step 620 has completed, then method 600 terminates, and operation proceeds normally for completing the new snap creation (see step 610) or WRITE (see step 615) operation.

Thus, techniques have been presented for detecting consistency errors within metadata arranged in a hierarchy 43, 101 used to manage and locate user data so that the errors may be corrected before the metadata becomes irreparably corrupted. This may be accomplished by performing (potentially) frequent validation on MD pages 46, 146 to verify that related MD pages 46, 146 within the hierarchy 43, 101 have consistent descriptive information 47. If the descriptive information 47 for two MD pages 46, 146 that ought to be related is not consistent, then it is likely that one of the MD pages 46, 146 has become misplaced or that the descriptive information 47 has become corrupted. Validation of this kind (e.g., method 300) may be performed as part of certain I/O processing (e.g., by becoming part of the I/O path as in methods 400, 500, 600), thus, rapidly detecting errors in order to initiate corrective actions (step 330).

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of validating metadata pages that map to user data in a data storage system, the method comprising:
    obtaining first information stored for a first metadata page and second information stored for a second metadata page, the first and second metadata pages having a relationship to each other within a hierarchy of metadata pages for accessing user data, wherein obtaining the first information stored for the first metadata page includes reading the first information stored for the first metadata page from a descriptive portion of the first metadata page, and wherein obtaining the second information stored for the second metadata page includes reading the second information stored for the second metadata page from a descriptive portion of the second metadata page;
    performing a consistency check between the first information stored for the first metadata page and the second information stored for the second metadata page, at least in part by determining whether the first information stored for the first metadata page and the second information stored for the second metadata page both include a same snap group identifier that identifies the first and second metadata pages as belonging to a same snap group, wherein the snap group is defined as a single logical disk and all snapshots of that logical disk, the consistency check producing a first result in response to the relationship being verified and a second result otherwise;
    in response to the consistency check yielding the second result, performing a corrective action to restore consistency between the first and second information;
    wherein the first and second metadata pages are cached within first system memory of a first processing node of the data storage system; and
    wherein performing the corrective action to restore consistency between the first information stored for the first metadata page and the second information stored for the second metadata page includes:
        the first processing node requesting corresponding versions of the first and second metadata pages from second system memory of a second processing node of the data storage system;
        in response to requesting the corresponding versions failing to restore consistency between the first information stored for the first metadata page and the second information stored for the second metadata page, reading persistent versions of the first and second metadata pages into the first system memory in place of the cached first and second metadata pages; and
        in response to reading the persistent versions of the first and second metadata pages into the first system memory failing to restore consistency between the first information stored for the first metadata page and the second information stored for the second metadata page, performing a metadata consistency check on the entire hierarchy of metadata pages.

2. The method of claim 1 wherein the first metadata page is a parent node to the second metadata page within a B-tree.

3. The method of claim 2,
    wherein the first information stored for the first metadata page includes a first positional address identifying a first address range of user data mapped by the first metadata page;
    wherein the second information stored for the second metadata page includes a second positional address identifying a second address range of user data mapped by the second metadata page; and wherein performing the consistency check further includes determining whether the second address range is encompassed within the first address range.

4. The method of claim 2 wherein performing the consistency check between the first information stored for the first metadata page and the second information stored for the second metadata page is done in response to the data storage system receiving a read command directed at a user data page having an address mapped by both the first metadata page and the second metadata page.

5. The method of claim 1 wherein the first and second metadata pages are peer nodes within a B-tree, the second metadata page having been cloned from the first metadata page.

6. The method of claim 5, wherein the first information stored for the first metadata page includes a first positional address identifying a first address range of user data mapped by the first metadata page;

wherein the second information stored for the second metadata page includes a second positional address identifying a second address range of user data mapped by the second metadata page; and wherein performing the consistency check further includes determining whether the first positional addresses equals the second positional address.

7. The method of claim 5, wherein the first information stored for the first metadata page includes a first pointer pointing to the second metadata page;

wherein the second information stored for the second metadata page includes a second pointer indicating a source metadata page from which the second metadata page was cloned; and wherein performing the consistency check further includes determining whether the second pointer points to the first metadata page.

8. The method of claim 5 wherein performing the consistency check between the first information stored for the first metadata page and the second information stored for the second metadata page is done in response to a snapshot creation operation, the first metadata node mapping to an initial state of a logical disk prior to the snapshot creation operation and the second metadata node mapping to one of (a) a subsequent state of the logical disk after the snapshot creation operation and (b) a state of a snapshot taken of the logical disk.

9. The method of claim 5 wherein performing the consistency check between the first information stored for the first metadata page and the second information stored for the second metadata page is done in response to a write-split on a write operation to a logical disk with an associated snapshot, the first metadata node mapping to an initial state of a logical disk prior to the write-split and the second metadata node mapping to one of (a) a subsequent state of the logical disk after the write-split and (b) a state of a snapshot taken of the logical disk after the write-split.

10. The method of claim 1 wherein performing the consistency check between the first information stored for the first metadata page and the second information stored for the second metadata page further includes determining whether the first information stored for the first metadata page and the second information stored for the second metadata page both include a same deduplication group identifier that identifies the first and second metadata pages as belonging to a same deduplication group, wherein deduplication group is defined as a set of logical disks across which an identical set of data blocks are deduplicated.

11. The method of claim 1, wherein the first metadata page contains pointers to pages of user data embedded within an aggregation of pages of user data;

wherein the second metadata page is associated with the aggregation of pages of user data;

wherein the second metadata page contains pointers to one or more metadata pages that contain pointers pointing to the aggregation of pages of user data associated with the second metadata page; and wherein performing the consistency check includes determining whether one of the pointers within the second metadata page points to the first metadata page.

12. The method of claim 11 wherein performing the consistency check between the first information stored for the first metadata page and the second information stored for the second metadata page is done in response to the data storage system receiving a read command directed at a user data page pointed to by a pointer within the first metadata page.

13. The method of claim 11 wherein performing the consistency check between the first information stored for the first metadata page and the second information stored for the second metadata page is done in response to initiating a garbage collection flush operation configured to combine pages of user data of the one aggregation of pages of user data with pages of user data of another aggregation of pages of user data into a new aggregation of pages of user data and flush the new aggregation to persistent storage.

14. The method of claim 1, wherein the first and second metadata pages are cached within system memory; and wherein performing the corrective action includes reading persistent versions of the first and second metadata pages into system memory in place of the cached first and second metadata pages.

15. A data storage system comprising:

processing circuitry coupled to memory, configured to process data storage requests; and persistent storage storing user data;

wherein the processing circuitry coupled to memory is further configured to validate metadata pages that map to the user data by:

obtaining first information stored for a first metadata page and second information stored for a second metadata page, the first and second metadata pages having a relationship to each other within a hierarchy of metadata pages for accessing the user data, wherein obtaining the first information stored for the first metadata page includes reading the first information stored for the first metadata page from a descriptive portion of the first metadata page, and wherein obtaining the second information stored for the second metadata page includes reading the second information stored for the second metadata page from a descriptive portion of the second metadata page;

performing a consistency check between the first information stored for the first metadata page and the second information stored for the second metadata page, at least in part by determining whether the first information stored for the first metadata page and the second information stored for the second metadata page both include a same snap group identifier that identifies the first and second metadata pages as belonging to a same snap group, wherein the snap group is defined as a single logical disk and all snapshots of that logical disk, the consistency check producing a first result in response to the relationship being verified and a second result otherwise;

in response to the consistency check yielding the second result, performing a corrective action to restore consistency between the first information stored for the first metadata page and the second information stored for the second metadata page;

wherein the first and second metadata pages are cached within first system memory of a first processing node of the data storage system; and wherein performing the corrective action to restore consistency between the first information stored for the first metadata page and the second information stored for the second metadata page includes:

the first processing node requesting corresponding versions of the first and second metadata pages from second system memory of a second processing node of the data storage system;

in response to requesting the corresponding versions failing to restore consistency between the first information stored for the first metadata page and the second information stored for the second metadata page, reading persistent versions of the first and second metadata pages into the first system memory in place of the cached first and second metadata pages; and in response to reading the persistent versions of the first and second metadata pages into the first system memory failing to restore consistency between the first information stored for the first metadata page and the second information stored for the second metadata page, performing a metadata consistency check on the entire hierarchy of metadata pages.

16. A computer program product comprising a non-transitory computer-readable storage medium storing a set of instructions, which, when performed by processing circuitry of a data storage system, causes the processing circuitry to validate metadata pages that map to the user data by:

obtaining first information stored for a first metadata page and second information stored for a second metadata page, the first and second metadata pages having a relationship to each other within a hierarchy of metadata pages for accessing the user data, wherein obtaining the first information stored for the first metadata page includes reading the first information stored for the first metadata page from a descriptive portion of the first metadata page, and wherein obtaining the second information stored for the second metadata page includes reading the second information stored for the second metadata page from a descriptive portion of the second metadata page;

performing a consistency check between the first information stored for the first metadata page and the second information stored for the second metadata page, at least in part by determining whether the first information stored for the first metadata page and the second information stored for the second metadata page both include a same snap group identifier that identifies the first and second metadata pages as belonging to a same snap group, wherein the snap group is defined as a single logical disk and all snapshots of that logical disk, the consistency check producing a first result in response to the relationship being verified and a second result otherwise;

in response to the consistency check yielding the second result, performing a corrective action to restore consistency between the first information stored for the first metadata page and the second information stored for the second metadata page;

wherein the first and second metadata pages are cached within first system memory of a first processing node of the data storage system; and wherein performing the corrective action to restore consistency between the first information stored for the first metadata page and the second information stored for the second metadata page includes:

the first processing node requesting corresponding versions of the first and second metadata pages from second system memory of a second processing node of the data storage system;

in response to requesting the corresponding versions failing to restore consistency between the first information stored for the first metadata page and the second information stored for the second metadata page, reading persistent versions of the first and second metadata pages into the first system memory in place of the cached first and second metadata pages; and in response to reading the persistent versions of the first and second metadata pages into the first system memory failing to restore consistency between the first information stored for the first metadata page and the second information stored for the second metadata page, performing a metadata consistency check on the entire hierarchy of metadata pages.

* * * * *